US009032007B2

(12) United States Patent
Kwon et al.

(10) Patent No.: US 9,032,007 B2
(45) Date of Patent: May 12, 2015

(54) DISTRIBUTED PROCESSING SYSTEM AND METHOD FOR DISCRETE LOGARITHM CALCULATION

(71) Applicant: Samsung SDS Co., Ltd., Seoul (KR)

(72) Inventors: Soon Mok Kwon, Seongnam-si (KR); Seon Young Lee, Seoul (KR); Jung Hoon Sohn, Seoul (KR); Hyo Jin Yoon, Yongin-si (KR)

(73) Assignee: Samsung SDS Co., Ltd., Seoul (KR)

( * ) Notice: Subject to any disclaimer, the term of this patent is extended or adjusted under 35 U.S.C. 154(b) by 324 days.

(21) Appl. No.: 13/664,822

(22) Filed: Oct. 31, 2012

(65) Prior Publication Data
US 2013/0110899 A1    May 2, 2013

(30) Foreign Application Priority Data
Oct. 31, 2011  (KR) .................. 10-2011-0112373

(51) Int. Cl.
| G06F 7/00 | (2006.01) |
| G06F 7/72 | (2006.01) |
| H04L 9/30 | (2006.01) |

(52) U.S. Cl.
CPC ............... *G06F 7/72* (2013.01); *H04L 9/3013* (2013.01)

(58) Field of Classification Search
CPC ..... G06F 7/556; G06F 7/4833; G06F 1/0307; G06F 1/0356; H03M 7/50
USPC ......................................... 708/517, 491–492
See application file for complete search history.

(56) References Cited

U.S. PATENT DOCUMENTS

| 7,000,118 B1* | 2/2006 | Murthy et al. ................. 713/185 |
| 2001/0055388 A1* | 12/2001 | Kaliski, Jr. ....................... 380/30 |
| 2012/0311005 A1* | 12/2012 | Cheon et al. ................... 708/235 |

FOREIGN PATENT DOCUMENTS

| JP | 2007-212768 A | 8/2007 |
| JP | 2008-158458 A | 7/2008 |
| JP | 2011-095284 A | 5/2011 |

OTHER PUBLICATIONS

Communication dated Nov. 20, 2013, issued by the Korean Intellectual Property Office in counterpart Korean Application No. 10-2011-0112373.

* cited by examiner

*Primary Examiner* — Tan V. Mai
(74) *Attorney, Agent, or Firm* — Sughrue Mion, PLLC

(57) ABSTRACT

Distributed processing system and method for discrete logarithm calculation. The speed and resource efficiency of discrete logarithm calculation may be improved by allowing a plurality of operation agents to distributively process an operation of generating a modulo multiplication auxiliary table, an operation of generating a pre-calculation table, and an operation of searching for an answer by applying an iterated function for discrete logarithm calculation in a discrete logarithm calculation operation using the pre-calculation table.

11 Claims, 6 Drawing Sheets

DISTRIBUTED PROCESSING SYSTEM AND METHOD FOR DISCRETE LOGARITHM CALCULATION

CROSS-REFERENCE TO RELATED PATENT APPLICATION

This application claims the benefit of Korean Patent application No. 10-2011-0112373, filed on Oct. 31, 2011, in the Korean Intellectual Property Office, the disclosure of which is incorporated herein in its entirety by reference.

BACKGROUND OF THE INVENTION

1. Field of the Invention

The present invention relates to distributed processing system and method for discrete logarithm calculation, and more particularly, to distributed processing system and method for discrete logarithm calculation, capable of improving the speed and resource efficiency of the discrete logarithm calculation by allowing a plurality of operation agents to distributively process a discrete logarithm calculation operation using a pre-calculation table.

2. Description of the Related Art

A discrete logarithm problem is defined within a cyclic group regarding multiplication which is formed in a finite ring having N as a group order, is a problem for, when a generator of the cyclic group is g, searching for k that satisfies $y=g^k \mod N$ with respect to a given number (target element) y from among elements of the cyclic group, and may be broadly used in a public key encryption system, etc.

From among methods of solving the discrete logarithm problem, a discrete logarithm calculation method using a pre-calculation table is also referred to as a trapdoor discrete logarithm (TDL) and an operation of generating the pre-calculation table is referred to as chain generation. In the TDL, operations of generating a pre-calculation table and calculating a discrete logarithm are as described below.

Initially, with respect to a discrete logarithm problem, a group order N of a ring may be set as represented in Equation 1.

$$N=pq \text{ (}p\text{-}1 \text{ and } q\text{-}1 \text{ are multiples of a certain number of prime factors having sizes of } B\text{-smooth numbers and a certain number of prime factors having sizes equal to or less than } B/2\text{-smooth numbers)}$$
[Equation 1]

Here, B is generally set as a number equal to or greater than 80 in consideration of a cryptological stability.

If the prime factors are set as described above, sub-groups using the prime factors as group orders may be defined. In this case, a generator of each sub-group is referred to as a sub-generator.

A pre-calculation table may be generated with respect to a sub-generator of a sub-group corresponding to each prime factor. The pre-calculation table is a table for storing exponents and function values obtained by applying an iterated function such as an r-adding walk to a certain number of initial values having the sub-generator as a base and having different arbitrary exponents, and may be generated with respect to each prime factor.

A discrete logarithm problem with respect to the given number (target element) y from among elements of the cyclic group may be divided into a plurality of small discrete logarithm problems. If a given number in the divided small discrete logarithm problem is y', in order to solve a small discrete logarithm problem, an operation of applying an iterated function such as an r-adding walk to a value having y' as a base and having an arbitrary exponent is necessary.

In the operation of applying the iterated function, a small discrete logarithm problem may use a pre-calculation table generated with respect to a corresponding prime factor. If a value obtained when the iterated function is applied in an operation of solving a discrete logarithm problem equals to a function value in the pre-calculation table, the efficiency of overall operations may be increased by using previously calculated information in the pre-calculation table.

Also, in operations of generating a pre-calculation table and calculating a discrete logarithm with respect to a given number, an iterated function based on modulo multiplication has to be continuously used and, in order to promote the modulo multiplication, result values of modulo multiplication using a sub-generator of a sub-group corresponding to each prime factor may be previously calculated and stored in a table that is called as a modulo multiplication auxiliary table.

A representative algorithm related to promotion of an iterated function based on modulo multiplication using a modulo multiplication auxiliary table is, but not limited to, tag tracing.

As described above, conventionally, when a discrete logarithm problem required to issue an encryption key is calculated, attempts have been made to increase the efficiency of calculation by using tag tracing or a pre-calculation table. However, even when a method using tag tracing or a pre-calculation table is applied, quite large operation time and storage space are still required and thus a large number of encryption key issuing requests may not be easily and simultaneously processed.

Accordingly, a technology for increasing the efficiency of calculation not in terms of an algorithm but in terms of a system, for example, distributed processing, is demanded.

SUMMARY OF THE INVENTION

The present invention provides distributed processing system and method for discrete logarithm calculation, capable of improving the speed and resource efficiency of the discrete logarithm calculation by allowing a plurality of operation agents to distributively process a discrete logarithm calculation operation using a pre-calculation table.

According to an aspect of the present invention, there is provided a distributed processing method for discrete logarithm calculation, the method including setting p-1 and q-1 of a cyclic group having N=pq (p, q are prime numbers) as a modulo, as multiples of a predefined number of prime factors having sizes of B-smooth numbers and a predefined number of prime factors having sizes equal to or less than B/2-smooth numbers, thereby generating the cyclic group; a first allocation operation for allocating a number of the prime factors of p-1 and q-1 of the cyclic group to a plurality of operation agents in proportion to operation processing speeds of the operation agents; requesting the operation agents to generate a modulo multiplication auxiliary table corresponding to each of the prime factors allocated to each of the operation agents; a second allocation operation for allocating the prime factors of p-1 and q-1 of the cyclic group to the operation agents based on the sizes of the prime factors of p-1 and q-1 of the cyclic group and the operation processing speeds of the operation agents; requesting the operation agents to generate a pre-calculation table corresponding to each of the prime factors allocated to each of the operation agents; in order to calculate a discrete logarithm of a target element that belongs to the cyclic group, a third allocation operation for allocating the prime factors of p-1 and q-1 of the cyclic group to the operation agents based on the sizes of the prime factors of p-1 and q-1 of the cyclic group and the operation processing speeds of the operation agents; and requesting the operation agents to search for an answer by applying an iterated function for discrete logarithm calculation corresponding to each of the prime factors allocated to each of the operation agents.

The second allocation operation may include allocating the prime factors having sizes equal to or less than B/2-smooth numbers, to the operation agents in proportion to the operation processing speeds of the operation agents.

The second allocation operation may include allocating initial values of the pre-calculation table corresponding to each of the prime factors having sizes of B-smooth numbers, to the operation agents in proportion to the operation processing speeds of the operation agents.

The method may further include loading into memory the modulo multiplication auxiliary table corresponding to each of the allocated prime factors by an operation agent requested to generate the pre-calculation table with respect to each of the prime factors or requested to search for an answer by applying the iterated function for discrete logarithm calculation with respect to each of the prime factors.

The third allocation operation may include allocating the prime factors having sizes equal to or less than B/2-smooth numbers, to the operation agents in proportion to the operation processing speeds of the operation agents.

The third allocation operation may include allocating function input values to be input to the iterated function corresponding to each of the prime factors having sizes of B-smooth numbers, to the operation agents in such a way that a size of a subset to which the iterated function is applied is proportional to the operation processing speed of each of the operation agents.

According to another aspect of the present invention, there is provided a computer-readable recording medium having recorded thereon a computer program including a function of setting p-1 and q-1 of a cyclic group having N=pq (p, q are prime numbers) as a modulo, as multiples of a predefined number of prime factors having sizes of B-smooth numbers and a predefined number of prime factors having sizes equal to or less than B/2-smooth numbers, thereby generating the cyclic group; a function of allocating a number of the prime factors of p-1 and q-1 of the cyclic group to a plurality of operation agents in proportion to operation processing speeds of the operation agents; a function of requesting the operation agents to generate a modulo multiplication auxiliary table corresponding to each of the prime factors allocated to each of the operation agents; a function of allocating the prime factors of p-1 and q-1 of the cyclic group to the operation agents based on the sizes of the prime factors of p-1 and q-1 of the cyclic group and the operation processing speeds of the operation agents; a function of requesting the operation agents to generate a pre-calculation table corresponding to each of the prime factors allocated to each of the operation agents; a function of, in order to calculate a discrete logarithm of a target element that belongs to the cyclic group, allocating the prime factors of p-1 and q-1 of the cyclic group to the operation agents based on the sizes of the prime factors of p-1 and q-1 of the cyclic group and the operation processing speeds of the operation agents; and a function of requesting the operation agents to search for an answer by applying an iterated function for discrete logarithm calculation corresponding to each of the prime factors allocated to each of the operation agents.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The preceding merely illustrates the principles of the invention. It will thus be appreciated that one of ordinary skill in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

Functions of various devices that are illustrated in drawings including a function block denoted as a processor or as a similar concept with the processor, can be provided not only with specific hardware but also general hardware in which related software may be executed. When these functions are provided by the processor, the functions may be provided by a singular specific processor, a singular sharable processor, or plural processors in which sharing between the plural processors is possible. Also, usage of terms such as a processor, a control, or the like should not be construed as being limited to hardware capable of executing software but should be construed as indirectly including digital signal processor (DSP) hardware, read-only memory (ROM), random-access memory (RAM), and non-volatile memory used for storing software. Other well-known conventional hardware devices may be included.

The objects and advantages of the present invention can be understood and become clearer through embodiments disclosed in the detailed description of the invention. In the following description of the present invention, a detailed description of known functions and configurations incorporated herein will be omitted when it may make the subject matter of the present invention unclear.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in detail by explaining embodiments of the invention with reference to the attached drawings.

Figure 1:
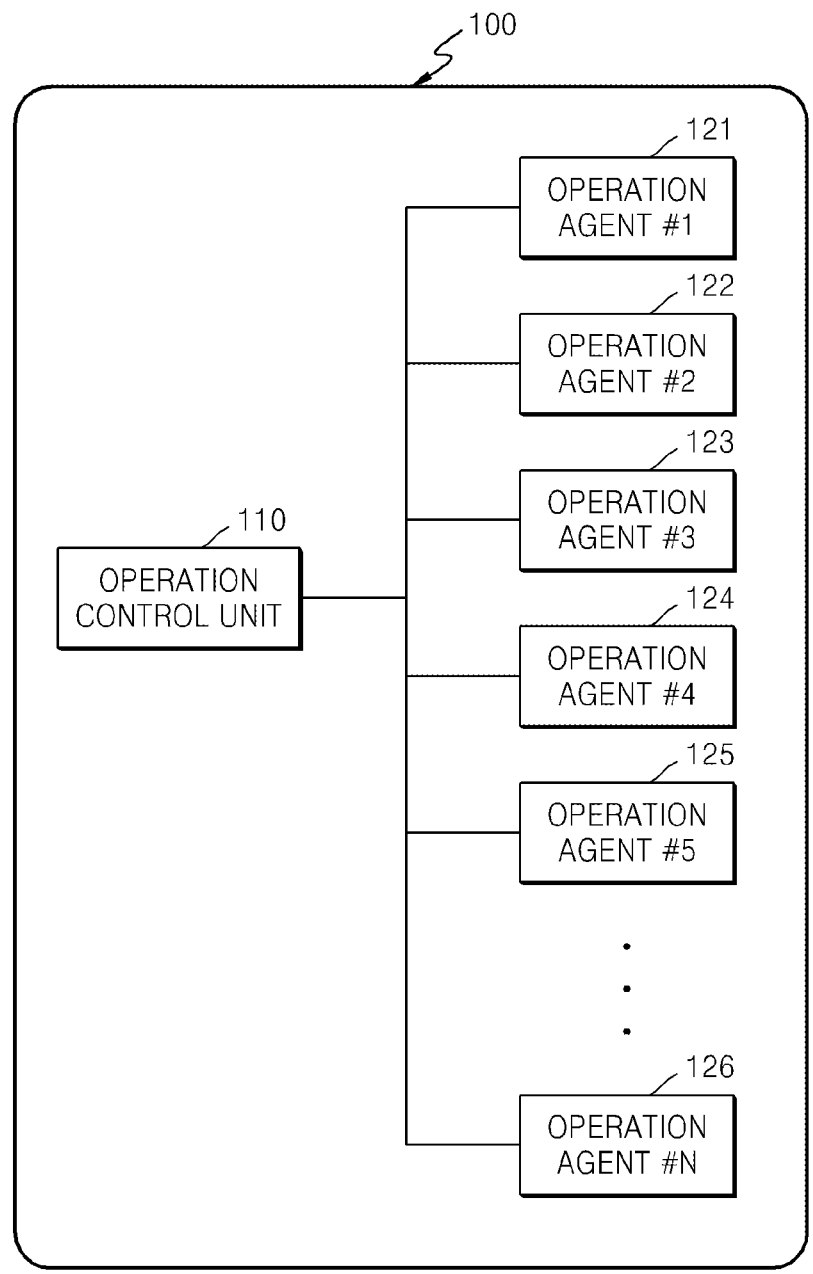
FIG. 1 is a block diagram of a distributed processing system for discrete logarithm calculation, according to an embodiment of the present invention.

FIG. 1 is a block diagram of a distributed processing system 100 for discrete logarithm calculation, according to an embodiment of the present invention.

Referring to FIG. 1, the distributed processing system 100 may include an operation control unit 110 and a plurality of operation agents 121 through 126. The distributed processing system 100 may include several ten to several ten thousand computing devices according to its use, and the computing devices may be driven in the form of physical or virtual machines.

Each computing device may perform a series of operations for solving a discrete logarithm problem by using computing resources allocated to the computing device. In the present invention, modules for performing operations by using computing resources are defined as the operation agents 121 through 126, and a module for controlling the operations of the operation agents 121 through 126 is defined as the operation control unit 110.

The operation control unit 110 may communicate with the operation agents 121 through 126, may distribute operations to each of the operation agents 121 through 126 in consideration of characteristics of the operations to be distributively processed by the operation agents 121 through 126, an operation processing speed according to computing resources allocated to a computing device including the operation agents 121 through 126, etc., and may collect operation results of the operation agents 121 through 126.

A time taken to perform a given operation may vary according to computing resources allocated to a computing device including the operation agents 121 through 126. Mostly, the time may depend on the speed of a central processing unit (CPU) and the size of memory. The operation control unit 110 may increase the efficiency of overall distributed processing by distributing operations according to operation processing speeds of the operation agents 121 through 126, which are determined according to the above factors.

The discrete logarithm calculation according to the current embodiment may mainly include three operations such as (1) an operation of generating a modulo multiplication auxiliary table, (2) an operation of generating a pre-calculation table (chain generation), and (3) an operation of ultimately calculating a discrete logarithm (a trapdoor discrete logarithm (TDL)).

Initially, the modulo multiplication auxiliary table is a table for storing values obtained by previously calculating result values of modulo multiplication using a sub-generator of each of sub-groups having prime factors of p-1 and q-1 of a cyclic group as group orders, as a base, and may be generated with respect to each prime factor. The operation of generating the modulo multiplication auxiliary table with respect to each prime factor is almost the same regardless of the sizes of the prime factors. Accordingly, when the operation is distributively processed by the operation agents 121 through 126, the amount of operation of each of the operation agents 121 through 126 is proportional to the number of allocated prime factors. Accordingly, the operation control unit 110 may divide the operation of generating the modulo multiplication auxiliary table with respect to each prime factor, and may allocate the operation to each of the operation agents 121 through 126 in such a way that the number of prime factors allocated to each of the operation agents 121 through 126 is proportional to its operation processing speed.

The pre-calculation table includes a chain of cyclic function values obtained by applying an iterated function to a predefined number of initial values having a sub-generator of each of sub-groups having the prime factors of p-1 and q-1 of the cyclic group as group orders, as a base, and having different arbitrary exponents. Like the operation of generating the modulo multiplication auxiliary table, the chain generation operation for generating the pre-calculation table may be performed with respect to each prime factor. However, unlike the operation of generating the modulo multiplication auxiliary table with respect to each prime factor, the amount of the operation of generating the pre-calculation table with respect to each prime factor greatly varies according to the sizes of the prime factors because the size of a prime factor is increased in proportion to the number of initial values to which the iterated function is applied. Accordingly, the operation control unit 110 may divide and allocate the chain generation operation with respect to each prime factor to the operation agents 121 through 126 in consideration of the sizes of allocated prime factors as well as the operation processing speeds of the operation agents 121 through 126.

In the operation of ultimately calculating the discrete logarithm, if a function value obtained by applying the iterated function to a value having a target element that belongs to a cyclic group, as a base, and having an arbitrary exponent, by using the modulo multiplication auxiliary table equals to a function value stored in the pre-calculation table, a discrete logarithm of the target element is calculated by using exponent information of the two function values. Since most part of discrete logarithm calculation corresponds to an operation of searching for an answer by applying the iterated function, the amount of operation may be proportional to the number of times that the iterated function is applied. Furthermore, since the iterated function has to be applied with respect to each of the prime factors, the operation of applying the iterated function may be divided and performed with respect to each prime factor.

Also, the size of a prime factor is proportional to the number of initial values to which the iterated function is applied and thus the number of times that the iterated function is applied is increased in proportion to the size of a prime factor. Accordingly, the operation control unit 110 may divide and allocate the operation of applying the iterated function for discrete logarithm calculation with respect to each prime factor, to the operation agents 121 through 126 in consideration of the sizes of the allocated prime factors as well as the operation processing speeds of the operation agents 121 through 126.

Figure 2:
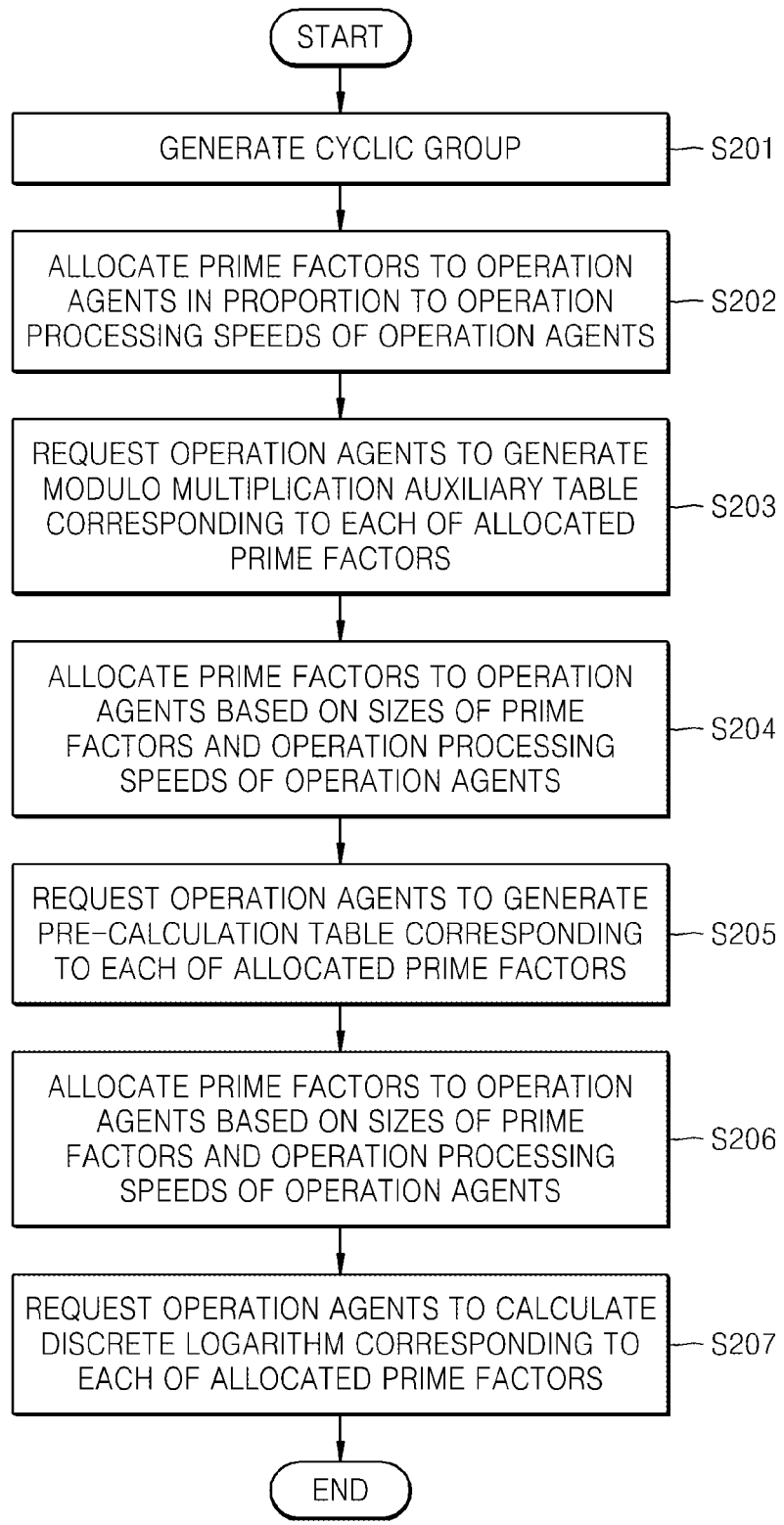
FIG. 2 is a flowchart of a distributed processing method performed by an operation control unit of a distributed processing system for discrete logarithm calculation, according to an embodiment of the present invention.

FIG. 2 is a flowchart of a distributed processing method performed by an operation control unit of a distributed processing system for discrete logarithm calculation, according to an embodiment of the present invention.

Referring to FIG. 2, initially, an operation control unit sets p-1 and q-1 of a cyclic group having N=pq (p, q are prime numbers) as a modulo, as multiples of a predefined number of prime factors having sizes of B-smooth numbers and a predefined number of prime factors having sizes equal to or less than B/2-smooth numbers, thereby generating the cyclic group (S201).

Here, the operation control unit may not directly generate the cyclic group, and may request one operation agent to perform an operation of generating the cyclic group and may receive a result of the operation. However, the present invention is not limited thereto.

In order to distributively process an operation of generating a modulo multiplication auxiliary table by previously calculating result values of modulo multiplication using a sub-generator of each of sub-groups as a base, the sub-groups having prime factors of p-1 and q-1 of the cyclic group generated in operation S201, as group orders, a number of the prime factors of p-1 and q-1 of the cyclic group are allocated to each of the operation agents in proportion to operation processing speeds of the operation agents (S202).

The operation agents are requested to generate the modulo multiplication auxiliary table corresponding to each of the prime factors allocated to each of the operation agents in operation S202 (S203).

If the modulo multiplication auxiliary table with respect to each of the prime factors is completely generated in operation S203, in order to generate a pre-calculation table including a chain of cyclic function values obtained by applying an iterated function to a predefined number of initial values having a sub-generator of each of the sub-groups having the prime factors of p-1 and q-1 of the cyclic group as group orders, as a base, and having different arbitrary exponents, the prime factors of p-1 and q-1 of the cyclic group are allocated to the operation agents based on the sizes of the prime factors of p-1 and q-1 of the cyclic group and the operation processing speeds of the operation agents (S204).

In this case, when the sizes of the prime factors are considered, with respect to a small prime factor having a size equal to or less than a B/2-smooth number, since the size of the prime factor is relatively small and thus the amount of the operation of generating the pre-calculation table by applying the iterated function does not greatly vary according to the sizes of the prime factors, like the operation of generating the modulo multiplication auxiliary table, a number of prime factors may be allocated in proportion to the operation processing speed of each of the operation agents.

However, with respect to a large prime factor having a size of a B-smooth number, unlike the small prime factor, since the amount of the operation of generating the pre-calculation table by applying the iterated function is relatively large, the operation may be distributed to a plurality of operation agents.

In more detail, in the operation of applying the iterated function corresponding to a large prime factor having a size of a B-smooth number, i.e., the operation of applying the iterated function with respect to a predefined number of initial values using a sub-generator of sub-groups having a large prime factor having a size of a B-smooth number as a group order, the operation of generating the pre-calculation table corresponding to the large prime factor may be divided with respect to the number of initial values and may be performed by a plurality of operation agents at the same time.

The operation agents are requested to generate the pre-calculation table corresponding to each of the prime factors allocated to each of the operation agents in operation S204 (S205).

If a function value obtained by applying the iterated function to a value having a target element that belongs to the cyclic group generated in operation S201, as a base, and having an arbitrary exponent, by using the modulo multiplication auxiliary table equals to a function value stored in the pre-calculation table, in order to calculate a discrete logarithm of the target element by using exponent information of the two function values, the prime factors of p-1 and q-1 of the cyclic group are allocated to the operation agents based on the sizes of the prime factors of p-1 and q-1 of the cyclic group and the operation processing speeds of the operation agents (S206).

The operation agents are requested to search for an answer by applying the iterated function for discrete logarithm calculation corresponding to each of the prime factors allocated to each of the operation agents in operation S206 (S207).

In this case, when the sizes of the prime factors are considered, with respect to a small prime factor having a size equal to or less than a B/2-smooth number, since the size of the prime factor is relatively small and thus the amount of the operation of applying the iterated function does not greatly vary according to the sizes of the prime factors, like the operation of generating the modulo multiplication auxiliary table, a number of prime factors may be allocated in proportion to the operation processing speed of each of the operation agents.

However, with respect to a large prime factor having a size of a B-smooth number, unlike the small prime factor, since the amount of the operation of applying the iterated function is relatively large, the operation may be distributed to a plurality of operation agents.

In more detail, in the operation of applying the iterated function corresponding to a large prime factor having a size of a B-smooth number, the operation of searching for an answer by applying the iterated function corresponding to prime factors and function input values may be divided and performed by a plurality of operation agents at the same time.

When the operation of searching for an answer by applying the iterated function for discrete logarithm calculation is divided with respect to one prime factor, if one of the operation agents finds an answer, the whole operation of applying the iterated function with respect to each of the prime factor is completed and thus the operation of applying the iterated function by the other operation agents may be stopped.

As such, although not shown in FIG. 2, if a search success message indicating that an answer is successfully found by applying the iterated function with respect to each of the prime factors having sizes of B-smooth numbers is received from an operation agent, a search stop message for requesting to stop applying the iterated function with respect to each of the prime factors having sizes of B-smooth numbers may be transmitted to the other operation agents requested to apply the iterated function with respect to each of the prime factors having sizes of B-smooth numbers.

Figure 3:
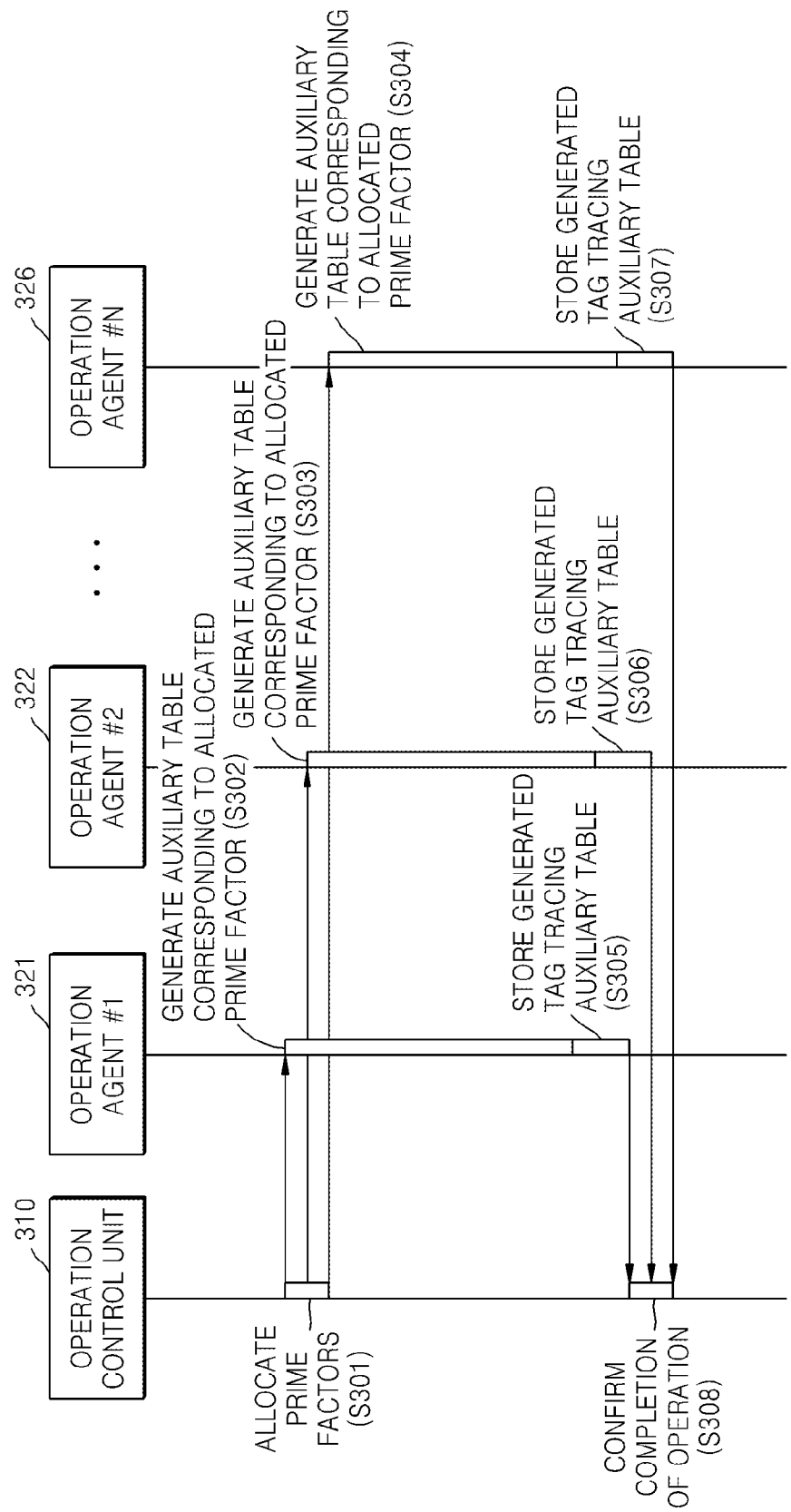
FIG. 3 is a process chart for describing distributed processing of an operation of generating an auxiliary table for tag tracing in a discrete logarithm calculation operation of a distributed processing system for discrete logarithm calculation, according to an embodiment of the present invention.

FIG. 3 is a process chart for describing distributed processing of an operation of generating a modulo multiplication auxiliary table (hereinafter referred to as an auxiliary table) for tag tracing in a discrete logarithm calculation operation of a distributed processing system for discrete logarithm calculation, according to an embodiment of the present invention. An operation control unit 310 and operation agents 321 through 326 of the distributed processing system illustrated in FIG. 3 respectively correspond to the operation control unit 110 and the operation agents 121 through 126 of the distributed processing system 100 illustrated in FIG. 1. Accordingly, descriptions provided in relation to the processing system 100 are not provided here.

Since the auxiliary table according to the current embodiment may be calculated with respect to each of prime factors of p-1 and q-1 of a cyclic group for discrete logarithm calculation, the operation control unit 310 allocates prime factors to each of the operation agents 321 through 326 (S301), and each of the operation agents 321 through 326 generates the auxiliary table corresponding to the allocated prime factors (S302 to S304).

In order to optimize a processing time of the above distributed processing, operations may be allocated in such a way that the operation agents 321 through 326 complete the operations at the same time, and the operation control unit 310 may allocate the prime factors in proportion to operation processing speeds of the operation agents 321 through 326.

If the auxiliary table is generated, each of the operation agents 321 through 326 stores the generated auxiliary table (S305 to S307) and the operation control unit 310 confirms completion of operations S305 to S307 (S308).

In this case, the auxiliary table may be stored in a local storage of a computing device for driving operation agents by which the auxiliary table is generated, or in a distributed database of the distributed processing system. However, the present invention is not limited thereto.

Figure 4:
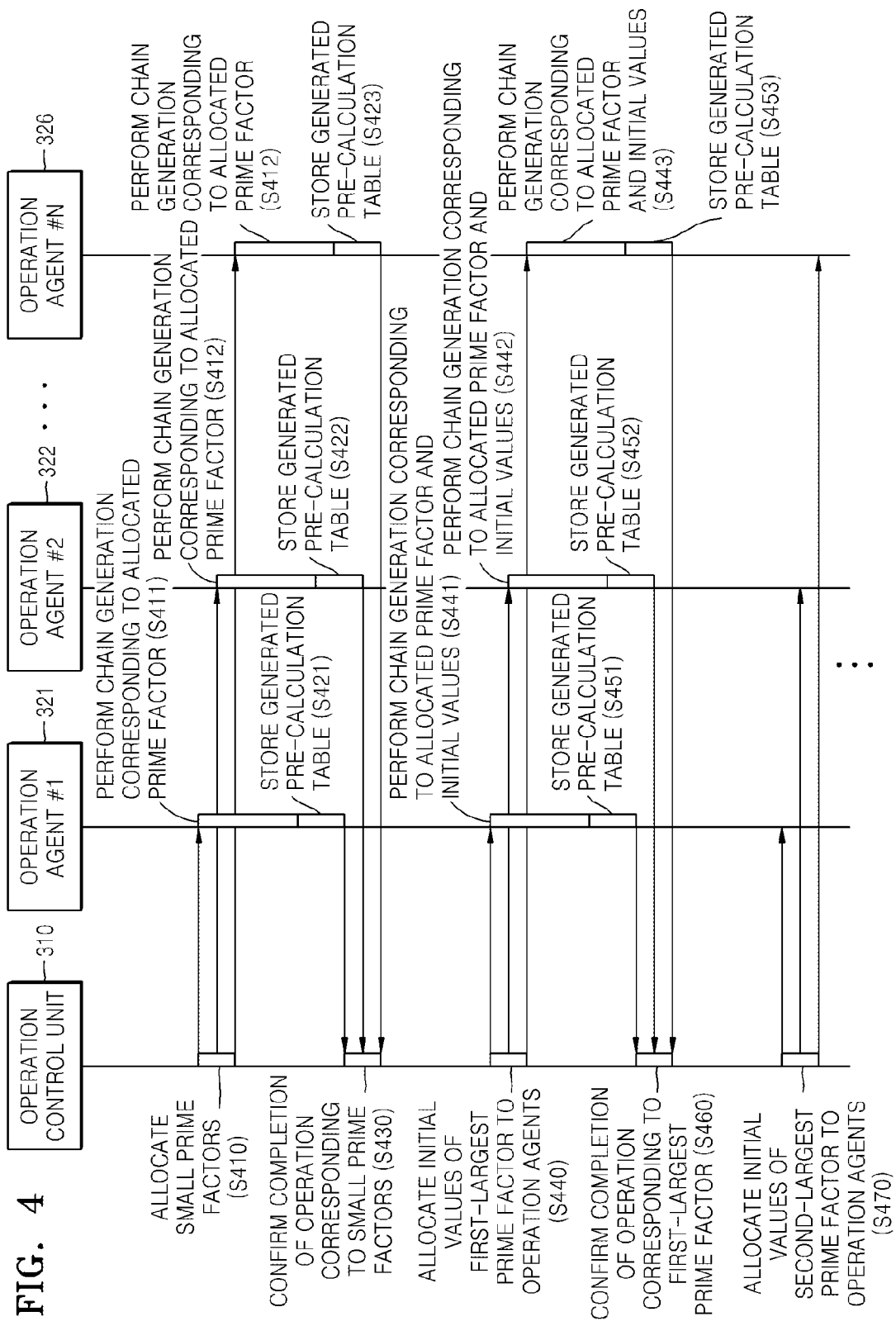
FIG. 4 is a process chart for describing distributed processing of an operation of generating a pre-calculation table in a discrete logarithm calculation operation of a distributed processing system for discrete logarithm calculation, according to an embodiment of the present invention.

FIG. 4 is a process chart for describing distributed processing of an operation of generating a pre-calculation table (hereinafter referred to as chain generation) in a discrete logarithm calculation operation of a distributed processing system for discrete logarithm calculation, according to an embodiment of the present invention. An operation control unit 310 and operation agents 321 through 326 of the distributed processing system illustrated in FIG. 4 respectively correspond to the operation control unit 110 and the operation agents 121 through 126 of the distributed processing system 100 illustrated in FIG. 1. Accordingly, descriptions provided in relation to the processing system 100 are not provided here.

The chain generation operation according to the current embodiment may be performed with respect to each of prime factors of p-1 and q-1 of a cyclic group for discrete logarithm calculation. In order to optimize a processing time of the above distributed processing, operations may be allocated in such a way that the operation agents 321 through 326 complete the operations at the same time.

The amount of the chain generation operation is greatly influenced by the size of a prime factor because, in the chain generation operation corresponding to a large prime factor, the number of initial values to which an iterated function for the chain generation operation is applied is increased in proportion to the size of the prime factor.

Accordingly, the chain generation operation is divided into two steps in the current embodiment. The chain generation operation corresponding to small prime factors, e.g., prime factors having sizes equal to or less than B/2-smooth numbers, is initially distributed to and processed by the operation agents 321 through 326 in units of prime factors (S410 to S430), and then the chain generation operation corresponding to each of large prime factors, e.g., prime factors having sizes of B-smooth numbers, is distributed to and processed by the operation agents 321 through 326 in units of prime factors and initial values (S440 to S470).

Initially, with respect to small prime factors having sizes equal to or less than B/2-smooth numbers, the operation control unit 310 allocates the small prime factors in proportion to operation processing speeds of the operation agents 321 through 326 (S410), and each of the operation agents 321 through 326 performs the chain generation operation corresponding to the allocated prime factors (S411 to S413), and stores a generated pre-calculation table (S421 to S423).

After the chain generation operation corresponding to the small prime factors having sizes equal to or less than B/2-smooth numbers is completed (S430), the operation control unit 310 allows the chain generation operation corresponding to a first-largest prime factor from among the large prime factors having sizes of B-smooth numbers, to be distributively processed by the operation agents 321 through 326.

For this, in addition to the first-largest prime factor, the operation control unit 310 allocates initial values used in the pre-calculation table corresponding to the first-largest prime factor from among the large prime factors having sizes of B-smooth numbers, to the operation agents 321 through 326 (S440), and each of the operation agents 321 through 326 performs the chain generation operation corresponding to the allocated prime factor and the initial values (S441 to S443), and stores a generated pre-calculation table (S451 to S453).

After the chain generation operation corresponding to the first-largest prime factor is completed (S460), the operation control unit 310 may repeatedly perform the chain generation operation corresponding to each of the other large prime factors similarly to the chain generation operation (S440 to S460) corresponding to the first-largest prime factor (S470).

Although the chain generation operation corresponding to the first-largest prime factor is distributed to and processed by all operation agents in FIG. 4, according to the number of initial values, the chain generation operation may be distributed to and processed by only some operation agents and the chain generation operation corresponding to a second-largest prime factor or other large prime factors may be distributed to and processed by other operation agents. However, the present invention is not limited thereto.

Furthermore, when the chain generation operation is repeatedly performed with respect to each prime factor, the auxiliary table generated with respect to each prime factor in FIG. 3 may be used. If the auxiliary table is stored in a local storage of a computing device for driving operation agents by which the auxiliary table is generated, in order to allow the auxiliary table to be easily accessed in the chain generation operation, prime factors may be allocated to the operation agents 321 through 326 like they are allocated when the auxiliary table is generated.

The pre-calculation tables generated due to the chain generation operation according to current embodiment may be stored in a distributed database of the distributed processing system illustrated in FIG. 4. In order to easily search the distributed database by using a result value of the iterated function, a storage location may be determined by using a predetermined bit of a portion of the result value of the iterated function, which is used as a search key, other than tag portions that are the same with respect to all key values according to characteristics of tag tracing. However, the present invention is not limited thereto.

Figure 5:
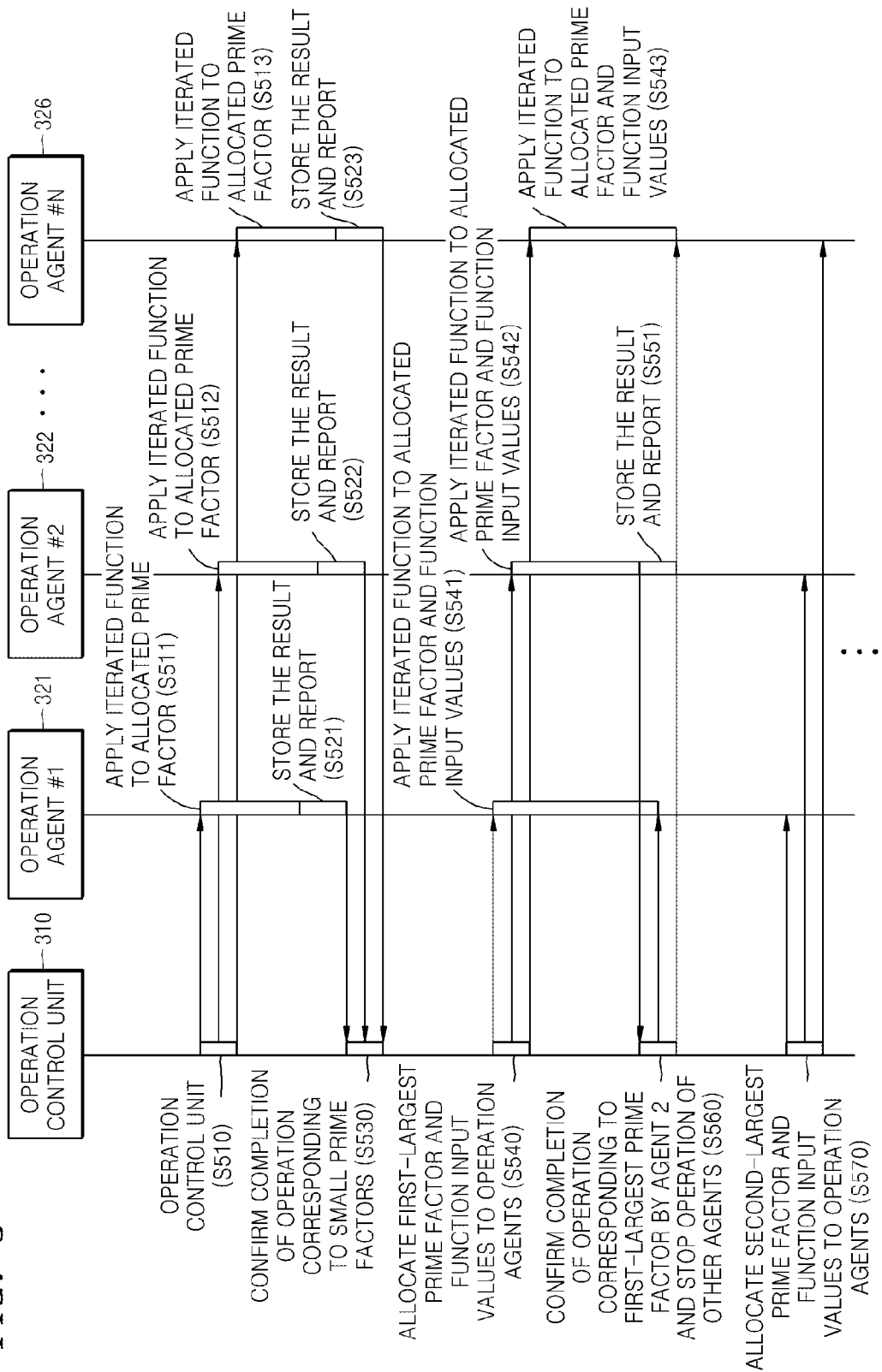
FIG. 5 is a process chart for describing distributed processing of an operation of calculating a discrete logarithm in a discrete logarithm calculation operation of a distributed processing system for discrete logarithm calculation, according to an embodiment of the present invention.

FIG. 5 is a process chart for describing distributed processing of an operation of calculating a discrete logarithm in a discrete logarithm calculation operation of a distributed processing system for discrete logarithm calculation, according to an embodiment of the present invention. An operation control unit 310 and operation agents 321 through 326 of the distributed processing system illustrated in FIG. 5 respectively correspond to the operation control unit 110 and the operation agents 121 through 126 of the distributed processing system 100 illustrated in FIG. 1. Accordingly, descriptions provided in relation to the processing system 100 are not provided here.

An operation of applying an iterated function for discrete logarithm calculation according to the current embodiment may be performed with respect to each of prime factors of p-1 and q-1 of a cyclic group for discrete logarithm calculation. Since most part of discrete logarithm calculation corresponds to an operation of searching for an answer by performing the operation of applying the iterated function, the operation of applying the iterated function for discrete logarithm calculation may be distributively processed with respect to each prime factor.

The number of times that the operation of applying the iterated function is performed is influenced by the size of a prime factor because, in the operation of applying the iterated function corresponding to a large prime factor, the number of function input values to be input to the iterated function together with the prime factor is increased in proportion to the size of the prime factor.

Accordingly, the operation of applying the iterated function is divided into two steps in the current embodiment. The operation of applying the iterated function for discrete logarithm calculation corresponding to small prime factors, e.g., prime factors having sizes equal to or less than B/2-smooth numbers, is initially distributed to and processed by the operation agents 321 through 326 in units of prime factors (S510 to S530), and then the operation of applying the iterated function for discrete logarithm calculation with respect to each of large prime factors, e.g., prime factors having sizes of B-smooth numbers, is distributed to and processed by the operation agents 321 through 326 in units of prime factors and initial values (S540 to S570).

Initially, with respect to small prime factors having sizes equal to or less than B/2-smooth numbers, the operation control unit 310 allocates the small prime factors in proportion to operation processing speeds of the operation agents 321 through 326 (S510), and each of the operation agents 321 through 326 performs the operation of applying the iterated function for discrete logarithm calculation corresponding to the allocated prime factors (S511 to S513), and stores a result of the operation of applying the iterated function including an answer found by performing the operation of applying the iterated function (S521 to S523).

After the operation of applying the iterated function corresponding to the small prime factors having sizes equal to or less than B/2-smooth numbers is completed (S530), the operation control unit 310 allows the operation of applying the iterated function corresponding to a first-largest prime factor from among the large prime factors having sizes of B-smooth numbers, to be distributively processed by the operation agents 321 through 326.

For this, in addition to the first-largest prime factor, the operation control unit 310 allocates function input values to be input to the iterated function corresponding to the first-largest prime factor from among the large prime factors having sizes of B-smooth numbers, to the operation agents 321 through 326 (S540), and each of the operation agents 321 through 326 performs the operation of applying the iterated function corresponding to the allocated prime factor and the function input values (S541 to S543), and stores a result of the operation of applying the iterated function including an answer found by performing the operation of applying the iterated function (S551).

That is, since the operation control unit 310 allows the operation of applying the iterated function to be distributively processed by the operation agents 321 through 326 by allocating different function input values to the operation agents 321 through 326 with respect to one large prime factor and thus allowing the operation agents 321 through 326 to apply the iterated function to different portions of the cyclic group. For example, if the operation of applying the iterated function with respect to one prime factor is distributively processed by n operation agents having the same operation processing speed, when multiplication is performed by using an exponent multiplier of a sub-generator while applying an r-adding walk as the iterated function, the iterated function may be applied by setting exponentiation of an ith operation agent as a number of i modulo n.

In this case, since the size of a subset to which the iterated function is applied in a cyclic group corresponding to the prime factor is an expected amount of operation, the operation control unit 310 may allocate function input values to the operation agents 321 through 326 in such a way that the size of a subset to which the iterated function is applied is proportional to the operation processing speed of each of the operation agents 321 through 326.

From among the operation agents 321 through 326 to which the operation of applying the iterated function corresponding to one prime factor is allocated, if one operation agent completes its operation and obtains an answer, since the operation of applying the iterated function corresponding to the prime factor is completed, the other operation agents which are performing the operation of applying the iterated function corresponding to the prime factor may stop the operation of applying the iterated function.

For example, if the operation agent 322 completes its operation and transmits an operation completion message to the operation control unit 310, the operation control unit 310 may receive the operation completion message and may transmit an operation stop request message to the other operation agents 310, 321, and 323 through 326 which are performing the operation of applying the iterated function corresponding to the prime factor (S560).

Although the operation of applying the iterated function corresponding to the first-largest prime factor is distributed to and processed by all operation agents in FIG. 5, according to the number of function input values, the operation of applying the iterated function may be distributed to and processed by only some operation agents and the operation of applying the iterated function corresponding to a second-largest prime factor or other large prime factors may be distributed to and processed by other operation agents. However, the present invention is not limited thereto.

Furthermore, when a chain generation operation is repeatedly performed with respect to each prime factor, the auxiliary table generated with respect to each prime factor in FIG. 3 may be used. If the auxiliary table is stored in a local storage of a computing device for driving operation agents by which the auxiliary table is generated, in order to allow the auxiliary table to be easily accessed in the chain generation operation, prime factors may be allocated to the operation agents 321 through 326 like they are allocated when the auxiliary table is generated.

The auxiliary table for tag tracing is used in chain generation and the operation of applying the iterated function for discrete logarithm calculation with respect to each prime factor, and may be loaded into memory of an operation agent in order to improve an operation processing speed.

Accordingly, before a chain generation operation or a discrete logarithm calculation operation with respect to each prime factor is started, the auxiliary table to be used in the operation may be loaded into memory.

Figure 6:
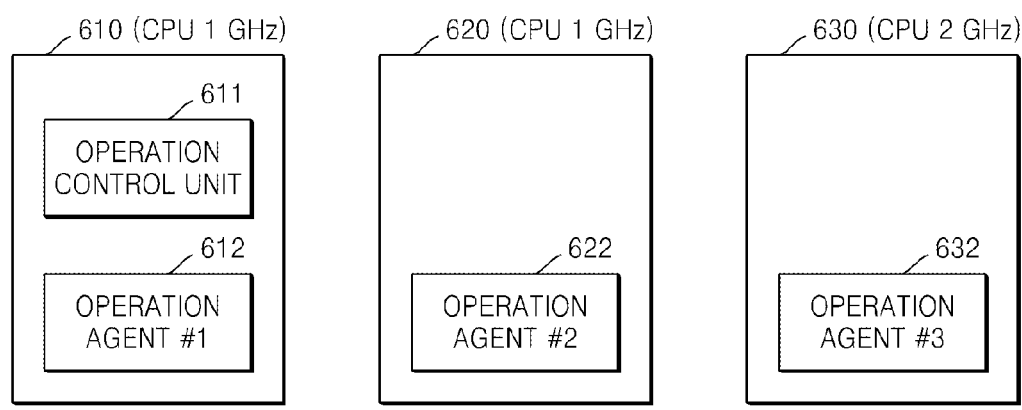
FIG. 6 is a block diagram for describing distributed processing in a distributed processing system for discrete logarithm calculation, according to an embodiment of the present invention.

FIG. 6 is a block diagram for describing distributed processing in a distributed processing system for discrete logarithm calculation, according to an embodiment of the present invention.

Referring to FIG. 6, three computing machines 610, 620, and 630 include an operation control unit 611 and first through third operation agents 612, 622, and 632. In FIG. 6, it is assumed that, from among prime factors of p-1 and q-1 of a cyclic group, 4 are large and 20 are small. In the following descriptions, the large prime factors are indicated as LP1 through LP4, and the small prime factors are indicated as SP1 through SP20.

For convenience of explanation, it is assumed that only CPU speeds of the computing machines 610, 620, and 630 influence operation processing speeds and they are 1:1:2. On the above assumption, relative operation processing speeds of the first through third operation agents 612, 622, and 632 are 1:1:2.

Initially, in an operation of generating an auxiliary table with respect to each prime factor, the operation control unit 611 allocates the prime factors in proportion to the relative operation processing speeds of the first through third operation agents 612, 622, and 632 regardless of the sizes of the prime factors. That is, 6 prime factors are allocated to each of the first and second operation agents 612 and 622, and 12 prime factors are allocated to the third operation agent 632.

Then, in a chain generation operation with respect to each of the small prime factors SP1 through SP20, the operation control unit 611 allocates the small prime factors SP1 through SP20 in proportion to the relative operation processing speeds of the first through third operation agents 612, 622, and 632 regardless of the sizes of the small prime factors SP1 through SP20. That is, 5 prime factors are allocated to each of the first and second operation agents 612 and 622, and 10 prime factors are allocated to the third operation agent 632.

In the chain generation operation with respect to each of the large prime factors LP1 through LP4, the operation control unit 611 allocates initial values used in a pre-calculation table with respect to one of the large prime factors LP1 through LP4 to the first through third operation agents 612, 622, and 632. For example, if the large prime factor LP1 has 1000 initial values, 250 initial values may be distributed to and processed by each of the first and second operation agents 612 and 622, and 500 initial values may be distributed to and processed by the third operation agent 632. The above operation may be repeatedly performed with respect to each of the other large prime factors LP2 through LP4.

Then, in an operation of applying an iterated function for discrete logarithm calculation with respect to each of the small prime factors SP1 through SP20, the operation control unit 611 allocates the small prime factors SP1 through SP20 in proportion to the relative operation processing speeds of the first through third operation agents 612, 622, and 632 regardless of the sizes of the small prime factors SP1 through SP20. That is, 5 prime factors are allocated to each of the first and second operation agents 612 and 622, and 10 prime factors are allocated to the third operation agent 632.

In the operation of applying the iterated function with respect to each of the large prime factors LP1 through LP4, the operation control unit 611 allocates function input values to be input to the iterated function with respect to one of the large prime factors LP1 through LP4 to the first through third operation agents 612, 622, and 632. For example, when multiplication is performed by using an exponent multiplier of a sub-generator while applying an r-adding walk as the iterated function, the first operation agent 612 may set the exponent multiplier as a number of 1 modulo 4, the second operation agent 622 may set the exponent multiplier as a number of 3 modulo 4, and the third operation agent 632 may set the exponent multiplier as a number of 0 modulo 2.

If the second operation agent 622 finds an answer during each of the first through third operation agents 612, 622, and 632 performs the operation of applying the iterated function with respect to the large prime factor LP1, the second operation agent 622 stores a result of the operation of applying the iterated function in a distributed database, and notifies the operation control unit 611 that the answer is found. The operation control unit 611 requests the first and third operation agents 612 and 632 to stop performing the operation of applying the iterated function with respect to the large prime factor LP1. The above operation may be repeatedly performed with respect to each of the other large prime factors LP2 through LP4.

According to the present invention, distributed processing of discrete logarithm calculation using a pre-calculation table may improve the speed and resource efficiency of the discrete logarithm calculation, may be useful for an operation using discrete logarithm calculation, e.g., an operation of issuing a private key in a public key encryption system, and may appropriately drive the encryption system in an environment, e.g., a machine to machine (M2M) environment, in which a plurality of machines exist and a private key issuing request frequently occurs.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A distributed processing method for discrete logarithm calculation, the method comprising:

setting, by a main operation controller, p-1 and q-1 of a cyclic group having N=pq (p and q are prime numbers) as a modulo, as multiples of a predefined number of prime factors having sizes of B-smooth numbers and a predefined number of prime factors having sizes equal to or less than B/2-smooth numbers;

allocating, by the main operation controller, a number of prime factors of p-1 and q-1 of the cyclic group to a plurality of operation agent controllers in proportion to operation processing speeds of the operation agent controllers, as a first allocation operation;

requesting, by the main operation controller, the operation agent controllers to generate a modulo multiplication auxiliary table corresponding to each of the prime factors allocated to each of the operation agent controllers;

allocating, by the main operation controller, the prime factors of p-1 and q-1 of the cyclic group to the operation agent controllers based on sizes of the prime factors of p-1 and q-1 of the cyclic group and the operation processing speeds of the operation agent controller, as a second allocation operation;

requesting, by the main operation controller, the operation agent controllers to generate a pre-calculation table corresponding to each of the prime factors allocated to each of the operation agent controllers, allocating, by the main operation controller, the prime factors of p-1 and q-1 of the cyclic group to the operation agent controllers based on the sizes of the prime factors of p-1 and q-1 of the cyclic group and the operation processing speeds of the operation agent controllers, as a third allocation operation; and requesting, by the main operation controller, the operation agent controllers to search for an answer by applying an iterated function for discrete logarithm calculation corresponding to each of the prime factors allocated to each of the operation agent controllers.

2. The method of claim 1, wherein the modulo multiplication auxiliary table comprises previously calculated result values of modulo multiplication using a sub-generator of each of sub-groups having the prime factors of p-1 and q-1 of the cyclic group as group orders, as a base.

3. The method of claim 1, wherein the pre-calculation table comprises a chain of cyclic function values obtained by applying the iterated function to a predefined number of initial values having a sub-generator of each of sub-groups having the prime factors of p-1 and q-1 of the cyclic group as group orders, as a base, and having different arbitrary exponents.

4. The method of claim 1, wherein the discrete logarithm calculation comprises, if a first function value equals to a second function value stored in the pre-calculation table, calculating a discrete logarithm of a target element that belongs to the cyclic group by using exponent information of the first and the second function values, wherein the first function value is obtained by applying the iterated function to a value having the target element as a base and having an arbitrary number as an exponent, based on the modulo multiplication auxiliary table.

5. The method of claim 1, wherein the second allocation operation comprises allocating the prime factors having sizes equal to or less than B/2-smooth numbers, to the operation agent controllers in proportion to the operation processing speeds of the operation agent controllers.

6. The method of claim 1, wherein the second allocation operation comprises allocating initial values of the pre-calculation table corresponding to each of the prime factors having sizes of B-smooth numbers, to the operation agent controllers in proportion to the operation processing speeds of the operation agent controllers.

7. The method of claim 1, further comprising loading into memory the modulo multiplication auxiliary table corresponding to each of the allocated prime factors by one of the operation agent controllers requested to generate the pre-calculation table with respect to each of the prime factors or requested to search for an answer by applying the iterated function for discrete logarithm calculation with respect to each of the prime factors.

8. The method of claim 1, wherein the third allocation operation comprises allocating the prime factors having sizes equal to or less than B/2-smooth numbers, to the operation agent controllers in proportion to the operation processing speeds of the operation agent controllers.

9. The method of claim 1, wherein the third allocation operation comprises allocating function input values to be input to the iterated function corresponding to each of the prime factors having sizes of B-smooth numbers, to the operation agent controllers in such a way that a size of a subset to which the iterated function is applied is proportional to the operation processing speed of each of the operation agent controllers.

10. The method of claim 9, further comprising, if a search success message indicating that an answer is successfully found by applying the iterated function with respect to each of the prime factors having sizes of B-smooth numbers is received from one of the operation agent controllers, transmitting a search stop message for requesting to stop applying the iterated function with respect to each of the prime factors having sizes of B-smooth numbers, to another one of the operation agent controllers requested to apply the iterated function with respect to each of the prime factors having sizes of B-smooth numbers.

11. A non-transitory computer-readable recording medium storing a computer program that is executable by a main operation controller to perform a method comprising:

setting, by the main operation controller, p-1 and q-1 of a cyclic group having N=pq (p and q are prime numbers) as a modulo, as multiples of a predefined number of prime factors having sizes of B-smooth numbers and a predefined number of prime factors having sizes equal to or less than B/2-smooth numbers;

allocating, by the main operation controller, a number of prime factors of p-1 and q-1 of the cyclic group to a plurality of operation agent controllers in proportion to operation processing speeds of the operation agent controllers;

requesting, by the main operation controller, the operation agent controllers to generate a modulo multiplication auxiliary table corresponding to each of the prime factors allocated to each of the operation agent controllers;

allocating, by the main operation controller, the prime factors of p-1 and q-1 of the cyclic group to the operation agent controllers based on sizes of the prime factors of p-1 and q-1 of the cyclic group and the operation processing speeds of the operation agent controllers;

requesting, by the main operation controller, the operation agent controllers to generate a pre-calculation table corresponding to each of the prime factors allocated to each of the operation agent controllers;

allocating, by the main operation controller, the prime factors of p-1 and q-1 of the cyclic group to the operation agent controllers based on the sizes of the prime factors of p-1 and q-1 of the cyclic group and the operation processing speeds of the operation agent controllers; and requesting, by the main operation controller, the operation agent controllers to search for an answer by applying an iterated function for discrete logarithm calculation corresponding to each of the prime factors allocated to each of the operation agent controllers.

* * * * *